United States Patent [19]

Yasui et al.

[11] Patent Number: 5,238,147
[45] Date of Patent: Aug. 24, 1993

[54] METHOD OF METERING MOLDING COMPOUND AND A METERING SYSTEM FOR CARRYING OUT THE SAME

[75] Inventors: Seiji Yasui; Masanobu Kurumaji, both of Kobe, Japan

[73] Assignee: Kabushiki Kaisha Kobe Seiko Sho, Kobe, Japan

[21] Appl. No.: 940,990

[22] Filed: Sep. 4, 1992

[30] Foreign Application Priority Data

Sep. 6, 1991 [JP] Japan .................................. 3-227320

[51] Int. Cl.5 .................................................. B29F 1/02
[52] U.S. Cl. ......................................... 222/1; 222/55; 222/63; 222/262; 222/334; 264/40.3; 425/145
[58] Field of Search ......... 222/1, 55, 61, 63, 260–263, 222/334; 425/146, 146, 149; 264/40.1, 40.3, 40.7, 328.1, 328.17

[56] References Cited

U.S. PATENT DOCUMENTS

| | | | |
|---|---|---|---|
| 3,797,808 | 3/1974 | Ma et al. | 222/63 X |
| 3,889,849 | 6/1975 | Chandler, Jr. | 425/145 X |
| 4,019,845 | 4/1977 | Birkhofer et al. | 425/146 |
| 4,545,504 | 10/1985 | Fabel et al. | 222/55 |
| 4,579,515 | 4/1986 | Kawaguchi et al. | 425/149 X |

FOREIGN PATENT DOCUMENTS 2201118 8/1988 United Kingdom ................ 264/403

Primary Examiner—Kevin P. Shaver
Attorney, Agent, or Firm—Oblon, Spivak, McClelland, Maier & Neustadt

[57] ABSTRACT

A molding compound metering system meters a molding compound in supplying the molding compound from a molding compound stocker into the injection chamber of an injection barrel by detecting the backward stroke of the injection plunger of an injection cylinder, axially slidably fitted in the injection chamber and detecting the pressure of the molding compound in the injection chamber of the injection barrel. When the injection plunger is moved backward by the pressure of the molding compound supplied into the injection chamber, the discharge of the working fluid from the back working chamber of the injection cylinder is regulated to apply back pressure to the injection plunger by an adjustable-pressure relief valve, and a regulated pressure is applied to the front working chamber of the injection cylinder. Thus, the adjustable-pressure relief valve is able to regulate the back pressure in a relatively high pressure range and, consequently, the back pressure can be accurately regulated to enhance the reliability of the metering operation.

3 Claims, 2 Drawing Sheets

METHOD OF METERING MOLDING COMPOUND AND A METERING SYSTEM FOR CARRYING OUT THE SAME

BACKGROUND OF THE INVENTION

1. Field of the Invention

The present invention relates to a method of metering a composite molding compound consisting of a resin and glass fibers or the like, to be applied to an injection molding mechanism, and a metering system for carrying out the same.

2. Description of the Prior Art

The compressibility of a composite molding compound consisting of a resin and glass fibers or the like, such as BMC (bulk molding compound) or SMC (sheet molding compound) is somewhat higher than that of a pure resin. Therefore, it is difficult to charge the accurate quantity of such a composite molding compound. Since glass fibers contained in a composite molding compound are entangled, injection molding machines of a screw type are rarely used for injecting a composite molding compound and injection molding machines of a plunger type are used in most cases for injecting a composite molding compound to avoid the dissociation and breakage of the entangled glass fibers.

FIG. 2 shows a prior art injection molding machine of a plunger type. This injection molding machine has an injection barrel 5, an injection plunger 6 slidably fitted in the injection chamber of the injection barrel 5, a stroke detecting mechanism 8 connected to the injection plunger 6, a compound stocker 3 containing a molding compound 4 and connected to the injection barrel 5, a metering cylinder 1 combined with the compound stocker 3 to feed the molding compound 4 contained in the compound stocker 3 into the injection barrel 5, and an adjustable-pressure relief valve 9 through which returning working fluid discharged from a back working chamber 7H of the injection cylinder 7, i.e., a working chamber of the injection cylinder 7 on the side of the cylinder head of the injection cylinder 7, is discharged.

In metering the molding compound 4 by the metering cylinder 1, the pressure of the returning working fluid discharged from the back working chamber 7H of the injection cylinder 7 is regulated by the adjustable-pressure relief valve 9 to apply a regulated back pressure to the injection plunger 6 so that the molding compound 4 is compressed during metering. Thus, the molding compound 4 can be relatively stably and correctly metered even if the compressibility of the molding compound 4 is relatively high.

In this prior art injection molding machine, in general, the ratio of the sectional area of the injection chamber of the injection barrel 5 to that of the injection cylinder 7 is 1/10 and usually the back pressure necessary for the compression metering of the molding compound 4 is in the range of 0 to 30 kg/cm². Accordingly, the adjustable-pressure relief valve 9 is required to regulate the pressure of the working fluid in the very low pressure regulating range of 0 to 3 kg/cm² to regulate the back pressure acting on the injection plunger 6.

Generally, the pressure regulating range for the adjustable-pressure relief valve 9 is 3 kg/cm² or above. Therefore, it is very difficult for the adjustable-pressure relief valve 9 to regulate the pressure of the working fluid in such a low pressure regulating range and the adjustable-pressure relief valve 9 is unable to achieve reliable pressure regulating operation. Consequently, the metering cylinder 1 must be a large cylinder or a high-pressure cylinder. Furthermore, if the fluidity of the molding compound is very low, it is possible that the molding compound does not flow smoothly during metering to cause short metering.

Furthermore, since the prior art injection molding machine detects the completion of metering operation merely through the detection of the stroke of the injection plunger 6, it is unlikely that reliability in metering a compressible molding compound can be further enhanced.

SUMMARY OF THE INVENTION

Accordingly, it is a first object of the present invention to provide a method of metering with compression a molding compound, capable of regulating the back pressure acting o the injection plunger of the injection cylinder in a reasonable pressure range by applying a pressure acting against the back pressure to the injection plunger.

A second object of the present invention is to provide a method of metering a molding compound, capable stably metering a molding compound by continuing the metering operation until the stroke of the injection plunger reaches a predetermined value and the pressure of the molding compound fed into the injection chamber of the injection barrel reaches a predetermined value.

A third object of the present invention is to provide a molding compound metering system comprising an adjustable-pressure relief valve through which working fluid discharged from the back working chamber of the injection cylinder, i.e., a working chamber of the injection cylinder on the side of the cylinder head of the injection cylinder, of an injection molding machine is discharged, an adjustable pressure reducing valve connected by a line to the front working chamber of the injection cylinder, i.e., a working chamber of the injection cylinder on the side of the rod, and a pressure sensor provided on the injection barrel of the injection molding machine, wherein the back pressure acting on the injection plunger of the injection molding machine is regulated the range of negative pressure to several kilogram per square centimeter optionally in a relatively high pressure range and the pressure of the molding compound in the injection chamber of the injection barrel is detected by the pressure sensor to improve molding compound metering accuracy.

In one aspect of the present invention, a molding compound metering method comprises simultaneous steps of: supplying a molding compound contained in a molding compound stocker into the injection chamber of an injection barrel to fill the injection chamber with a predetermined quantity of the molding compound by pushing a metering plunger axially slidably fitted in the molding compound stocker by a metering cylinder, and applying back pressure to the injection plunger of an injection cylinder, axially slidably fitted in the injection chamber of the injection barrel and being pushed backward by the molding compound supplied into the injection chamber of the injection barrel by regulating the discharge of the working fluid from the back working chamber of the injection cylinder, wherein the working fluid is supplied into the front working chamber of the injection cylinder to apply a pressure to the front working chamber of the injection cylinder.

In a second aspect of the present invention, further comprises detecting the stroke of the injection plunger and the pressure of the molding compound in the injection chamber of the injection barrel, and stopping the metering operation upon the coincidence of the stroke of the injection plunger and the pressure of the molding compound in the injection chamber of the injection barrel respectively with predetermined values.

In a third aspect of the present invention, a molding compound metering system comprises a stroke detecting mechanism for detecting the backward stroke of the injection cylinder of an injection molding machine, axially slidably fitted in the injection chamber of the injection barrel of the injection molding machine; a molding compound stocker containing a molding compound and connected by a supply line to the injection barrel; a metering cylinder having a metering plunger axially slidably fitted in the molding compound stocker so as to be advanced to supply the molding compound from the molding compound stocker into the injection chamber of the injection barrel; and an adjustable-pressure relief valve connected to the back working chamber of the injection cylinder to return the working fluid discharged from the back working chamber of the injection cylinder through the adjustable-pressure relief valve into a tank in supplying the molding compound into the injection chamber of the injection barrel; the improvement comprising an adjustable pressure reducing valve connected to the front working chamber of the injection cylinder by a line to supply the working fluid into the front working chamber, and a pressure sensor connected to the injection barrel to detect the pressure of the metered molding compound in the injection barrel.

When the molding compound is fed to the injection barrel by pushing the metering plunger by the metering cylinder, the injection plunger is moved backward by the molding compound fed to the injection barrel. Since the discharge of the working fluid from the back working chamber is regulated so that the working fluid is discharged at a predetermined discharge rate, back pressure acts on the injection plunger. At the same time, part of the working fluid being supplied to the metering cylinder is supplied through the line provided with the adjustable pressure reducing valve to the front working chamber to apply a high pressure to the front working chamber against the back pressure. Consequently, the back pressure prevailing in the back working chamber and determined by the adjustable-pressure relief valve corresponds substantially to the high pressure prevailing in the front working chamber. Accordingly, the adjustable-pressure relief valve is able to regulate the pressure of the working fluid discharged from the back working chamber in a high pressure range.

The pressure prevailing in the back working chamber and that prevailing in the front working chamber can be adjusted to optional values. The difference between the pressures acting respectively on the opposite sides of the injection plunger can be adjusted to an optional value in a relatively high pressure range and if a force of the pressure prevailing in the front working chamber is greater than that prevailing in the back working chamber, suction acts on the molding compound being supplied from the molding compound stocker into the injection barrel the molding compound is forced to flow into the injection barrel even if the molding compound has a very low fluidity.

Upon the detection of the arrival of the injection plunger moving backward at a predetermined position by the stroke detecting mechanism, the discharge of the working fluid from the back working chamber is stopped. Then, the metering cylinder further continues forcibly supplying the molding compound into the injection barrel 5 until the pressure in the injection barrel detected by a pressure sensor reaches a set point, so that the compressible molding compound is compressed sufficiently for metering.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
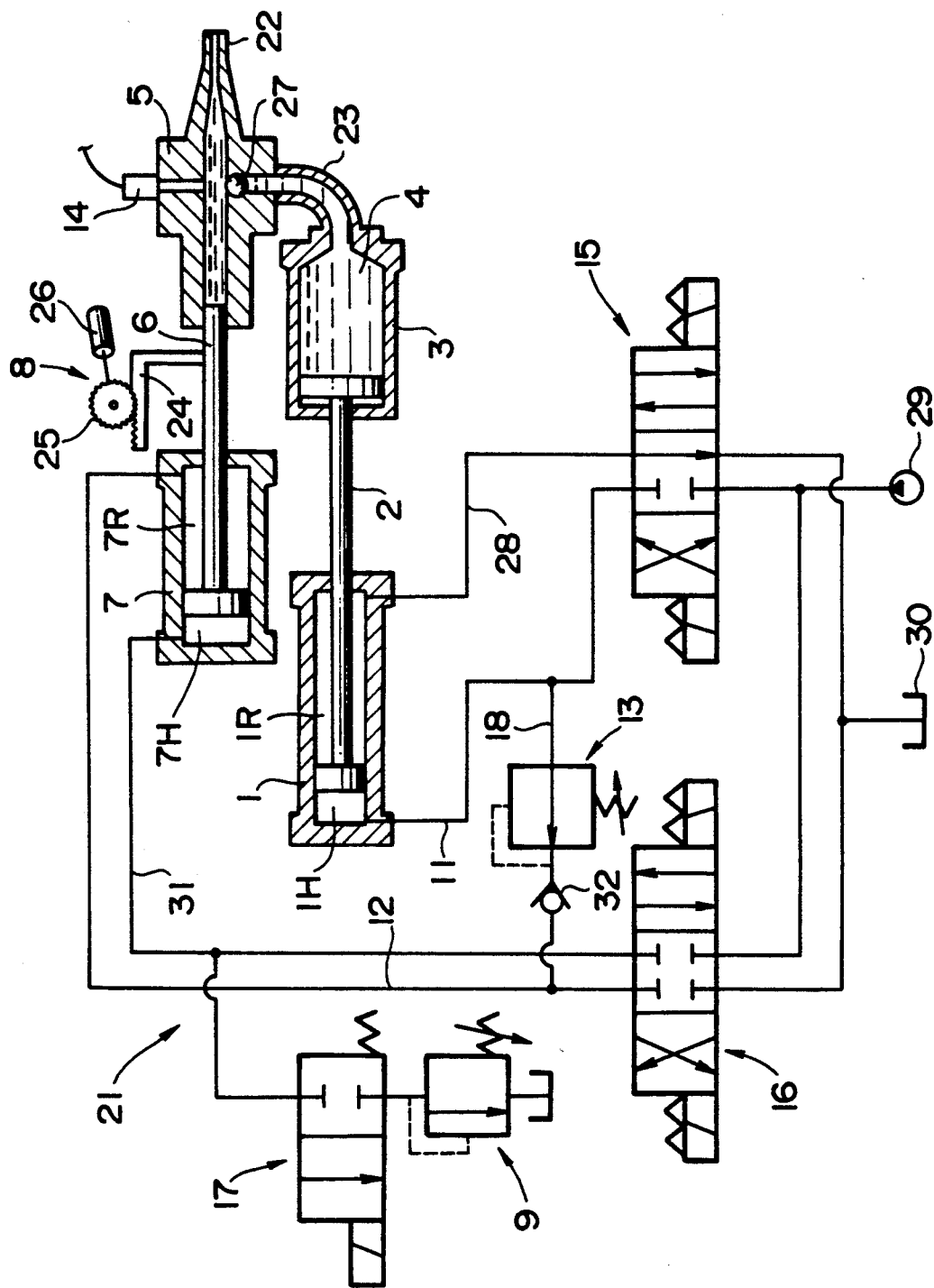
FIG. 1 is a diagram of a molding compound metering system in a preferred embodiment according to the present invention.
Figure 2:
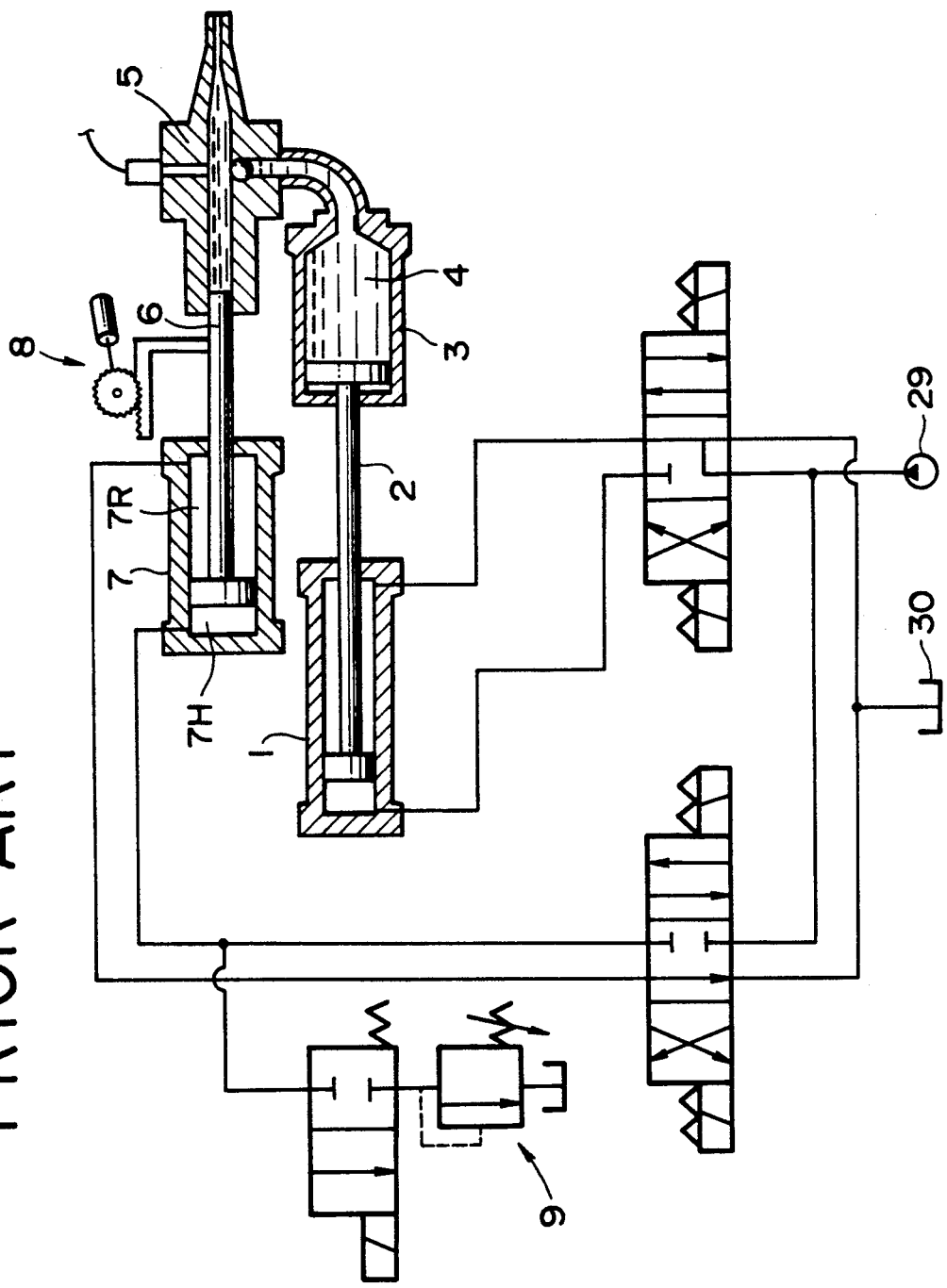
FIG. 2 is a diagram of a prior art molding compound metering system.

Referring to FIG. 1 showing a molding compound metering system 21 for an injection molding machine, the front portion of an injection plunger 6 is fitted slidably in the injection chamber of an injection barrel 5 having a nozzle 22, a molding compound stocker 3 is connected to the injection barrel 5 by an elbow 23, and a pressure sensor 14 is connected to the injection barrel 5 to detect the pressure of a molding compound 4 forced into the injection chamber of the injection barrel 5. The nozzle 22 is able to close itself or can be closed by an injection molding die. The injection plunger 6 is formed integrally with or coaxially connected to the piston rod of an injection cylinder 7. A stroke detector 8 for detecting the axial movement of the injection plunger 6 comprises a rack 24 formed in a portion of the injection plunger 6, a pinion 25 engaging the rack 24, and an encoder 26 associated with the pinion 25. A metering cylinder 1 has a metering plunger 2 slidably fitted in the molding compound stocker 3. The metering cylinder 1 extrudes the molding compound 4 from the molding compound stocker 3 through the elbow 23 into the injection chamber of the injection barrel 5. A check valve 27 is provided at the junction of the elbow 23 and the injection chamber of the injection barrel 5 to inhibit the reverse flow of the molding compound.

A supply line 11 is connected to the back chamber 1H of the metering cylinder 1 on the side of the cylinder head of the metering cylinder 1, and a return line 28 is connected to the front chamber 1R of the metering cylinder 1 on the side of the piston rod of the metering cylinder 1. The supply lines 11 and 28 are connected through a selector valve 15 respectively to a pump 29 and a tank 30. A supply line 31 and a return line 12 are connected respectively to the back chamber 7H and the front chamber 7R of the injection cylinder 7. The supply line 31 and the return line 12 are connected through a selector valve 16 respectively to the pump 29 and the tank 30. An adjustable-pressure relief valve 9 is connected to the supply line 12 to regulate the flow rate of the working fluid discharged from the back chamber 7H of the injection molding cylinder 7 and flowing to the tank 30, and a solenoid valve 17 is provided on a line connecting the supply line 12 to the relief valve 9. The relief valve 9 adjusts the pressure in the back chamber 7H.

The lines 11 and 12 are connected by a line 18 provided with an adjustable pressure reducing valve 13 and a check valve 32. In supplying the working fluid into the back chamber 1H of the metering cylinder 1 by the pump 29, part of the working fluid discharged from the pump 29 can be supplied to the front chamber 7R of the injection cylinder 7. The pressure of the working fluid being supplied into the front chamber 7R of the injection cylinder 7 is regulated by the pressure reducing valve 13 to adjust the pressure in the front chamber 7R acting against the pressure prevailing in the back chamber 7H.

A pressure $P_{7H}$ prevailing in the back chamber 7H and a pressure $P_{7R}$ prevailing in the front chamber 7R act oppositely to the piston of the injection cylinder 7. If the pressures $P_{7H}$ and $P_{7R}$ balance to each other, the injection plunger 6 is moved backward only by the pressure of the molding compound extruded by the metering cylinder 1 into the injection chamber of the injection barrel 5. Accordingly, if the pressure reducing valve 13 is set for a set pressure of several tens kilogram per square centimeter, the pressure regulating range of the relief valve 9 is on the order of several tens kilogram per square centimeter. The back pressure acting on the injection plunger 6 can be adjusted to an optional pressure in the range of negative pressure to several kilogram per square centimeter by adjusting the difference between the pressures $P_{7H}$ and $P_{7R}$.

A molding compound metering method in accordance with the present invention will be described concretely hereinafter.

The nozzle 22 is closed during the molding compound metering operation. The selector valve 15 is set to supply the working fluid through the line 11 into the back chamber 1H and to return the working fluid from the front chamber 1R through the line 28 to the tank 30. Then, the metering plunger 2 of the metering cylinder 1 extrudes the molding compound 4 from the molding compound stocker 3 into the injection chamber of the injection barrel 5 and, consequently, the injection plunger 6 is moved backward. At the same time, the working fluid is supplied also through the line 18 and the pressure reducing valve 13 into the front chamber 7R of the injection cylinder 7 to apply a pressure of several tens kilogram per square centimeter to the piston of the injection cylinder 7. At the same time, a valve 17 is opened to enable the working fluid to flow from the back chamber 7H of the injection cylinder 7 through the relief valve 9 into the tank 30. The relief pressure of the relief valve 9 is adjusted to adjust the pressure in the back chamber 7H of the injection cylinder 7 to, for example, several tens kilogram per square centimeter.

The difference between the pressure $P_{7H}$ and $P_{7R}$ is the effective pressure that moves the plunger 6. Either the relief valve 9 or the pressure reducing valve 13 is set for a fixed set pressure determined taking into consideration the properties of the molding compound and the set pressure of the other is adjusted to adjust the back pressure acting on the injection plunger 6 in the range of negative pressure to several kilogram per square centimeter. It is preferable that either the relief valve 9 or the pressure reducing valve 13 is a proportional operated solenoid valve to vary the back pressure according to the stroke of the injection plunger 6 detected by the stroke detecting mechanism 8.

If the molding compound has a relatively high fluidity, the back pressure acting on the injection plunger 6 is adjusted to a pressure in the range of 0 to 3 kg/cm². If the molding compound has a relatively low fluidity, the pressure $P_{7R}$ in the front chamber 7R is increased relatively beyond the pressure $P_{7H}$ in the back chamber 7H to push the injection plunger 6 positively so that suction acts on the molding compound being extruded from the molding compound stocker 3 into the injection chamber of the injection barrel 5. Namely, a negative pressure acts on the molding compound 4.

Upon the detection of the arrival of the injection plunger 6 at a predetermined back position by the stroke detecting mechanism 8, the valve 17 is closed to stop the backward movement of the injection plunger 6. In this state the injection chamber of the injection barrel 5 is filled with a quantity of the molding compound 4 substantially equal to a predetermined quantity. Then, the metering plunger 2 is advanced further by the metering cylinder 1 to increase the pressure of the molding compound 4 in the injection chamber of the injection barrel 5 to a set pressure for which the pressure sensor 14 is set, in order that a quantity of the molding compound 4 corresponding to the compression allowance of the molding compound 4 is supplied additionally into the injection chamber of the injection barrel 5.

When suction is applied to the injection chamber of the injection barrel 5 in metering the molding compound 4, the pressure of the molding compound 4 supplied into the injection chamber of the injection barrel 5 is increased to a set pressure in the final stage or after stop of the backward movement of the injection plunger 6.

The backward stroke of the injection plunger 6 is detected by the stroke detecting mechanism 8 and the pressure of the molding compound 4 in the injection chamber of the injection barrel 5 is detected by the pressure sensor 14. Upon the coincidence of the backward stroke of the injection plunger 6 and the pressure of the molding compound 4 in the injection chamber of the injection barrel 5 respectively with a set stroke and a set pressure, the metering operation is stopped. The molding compound 4 can be stably metered and metering error is within 3%.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A molding compound metering method, comprising simultaneous steps of:
    supplying a molding compound contained in a molding compound stocker into the injection chamber of an injection barrel to fill the injection chamber with a predetermined quantity of the molding compound by pushing a metering plunger axially slidably fitted in the molding compound stocker by a metering cylinder; and
    applying back pressure to the injection plunger of an injection cylinder, axially slidably fitted in the injection chamber of the injection barrel and being pushed backward by the molding compound supplied into the injection chamber of the injection barrel by regulating the discharge of the working fluid from the back working chamber of the injection cylinder;

wherein the working fluid is supplied into the front working chamber of the injection cylinder to apply a pressure acting against the back pressure to the front working chamber of the injection cylinder.

2. A molding compound metering method according to claim 1, wherein the backward stroke of the injection plunger and the pressure of the molding compound in the injection chamber of the injection barrel are detected, and the metering operation is stopped upon the coincidence of the backward stroke of the injection plunger and the pressure of the molding compound in the injection chamber of the injection barrel respectively with predetermined values.

3. A molding compound metering system comprising:

a stroke detecting mechanism for detecting the backward stroke of the injection plunger of the injection cylinder of an injection molding machine, axially slidably fitted in the injection chamber of the injection barrel of the injection molding machine;

a molding compound stocker containing a molding compound and connected by a supply line to the injection barre;

a metering cylinder having a metering plunger axially slidably fitted in the molding compound stocker so as to be advanced to supply the molding compound from the molding compound stocker into the injection chamber of the injection barre; and an adjustable-pressure relief valve connected to the back working chamber of the injection cylinder to return the working fluid discharged from the back working chamber of the injection cylinder through the adjustable-pressure relief valve into a tank in supplying the molding compound into the injection chamber of the injection barrel;

wherein the working fluid is supplied into the front working chamber of the injection cylinder through an adjustable pressure reducing valve to apply a pressure to the front working chamber of the injection cylinder when the injection plunger is moved backward by the pressure of the molding compound supplied into the injection chamber of the injection barrel in metering the molding compound, and a pressure sensor is provided on the injection barrel to detect the pressure of the molding compound in the injection chamber of the injection barrel.

* * * * *